United States Patent
Croy et al.

(10) Patent No.: US 8,140,653 B1
(45) Date of Patent: Mar. 20, 2012

(54) MANAGEMENT OF A MULTI-PROCESS SYSTEM

(75) Inventors: Timothy Croy, Belfast (GB); Kevin Hamilton, Belfast (GB); Gary McCullough, Ballymena (GB)

(73) Assignee: Avaya Inc., Basking Ridge, NJ (US)

( * ) Notice: Subject to any disclaimer, the term of this patent is extended or adjusted under 35 U.S.C. 154(b) by 1191 days.

(21) Appl. No.: 10/876,908

(22) Filed: Jun. 25, 2004

(51) Int. Cl.
*G06F 15/173* (2006.01)

(52) U.S. Cl. ........................................ 709/223

(58) Field of Classification Search ........... 709/220–226
See application file for complete search history.

(56) References Cited

U.S. PATENT DOCUMENTS

| | | | | |
|---|---|---|---|---|
| 5,748,882 A * | 5/1998 | Huang | 714/47.3 |
| 5,964,831 A * | 10/1999 | Kearns et al. | 709/201 |
| 6,185,184 B1 * | 2/2001 | Mattaway et al. | 370/230 |
| 6,282,175 B1 * | 8/2001 | Steele et al. | 370/254 |
| 6,584,502 B1 * | 6/2003 | Natarajan et al. | 709/224 |
| 6,631,407 B1 * | 10/2003 | Mukaiyama et al. | 709/223 |
| 6,714,217 B2 * | 3/2004 | Huang et al. | 715/736 |
| 6,769,024 B1 * | 7/2004 | Natarajan et al. | 709/224 |
| 6,973,491 B1 * | 12/2005 | Staveley et al. | 709/224 |
| 7,296,194 B1 * | 11/2007 | Lovy et al. | 714/57 |
| 2002/0124064 A1 * | 9/2002 | Epstein et al. | 709/221 |
| 2003/0005102 A1 * | 1/2003 | Russell | 709/223 |
| 2003/0055946 A1 * | 3/2003 | Amemiya | 709/224 |
| 2003/0055959 A1 * | 3/2003 | Sato | 709/224 |
| 2003/0120771 A1 * | 6/2003 | Laye et al. | 709/224 |
| 2005/0132030 A1 * | 6/2005 | Hopen et al. | 709/223 |
| 2005/0216584 A1 * | 9/2005 | Chisholm | 709/224 |

OTHER PUBLICATIONS

Smith, Mark et al., "Persistent Search: A Simple LDAP Change Notification Mechanism", pp. 1-9, Nov. 15, 2000.*

* cited by examiner

*Primary Examiner* — Jeffrey Pwu
*Assistant Examiner* — Scott M Sciacca
(74) *Attorney, Agent, or Firm* — Barnes & Thornburg LLP

(57) ABSTRACT

A system comprising a network of network elements and a data store associated with a data store manager. The data store contains data representing the actual state of the system and data representing a planned state of the system. The data store manager causes the network elements, or processes supported thereby, to conform with the planned system state. In addition, at least some of the processes communicate to the data store manager data representing their respective state. The data store manager, upon receipt of said data, updates the actual state data in accordance with the received data. The data store provides an actual model and a planned model of the system by which the state of the system can readily be managed.

32 Claims, 2 Drawing Sheets

MANAGEMENT OF A MULTI-PROCESS SYSTEM

FIELD OF THE INVENTION

The present invention relates to the management of a multi-process system.

BACKGROUND TO THE INVENTION

A multi-process system typically comprises a network of network elements each supporting one or more processes. Each network element is able to communicate with at least one other network element in the network via a physical layer communication link. Each process may communicate with one or more other processes residing on other network elements via an application layer communication link. In dynamic systems, the status and configuration of the processes may change during use. For example, the number and type of processes may be determined at run-time, the role of a process may change and/or the number of processes that are running may increase or decrease dynamically. As a result, inter-process interactions may also vary dynamically and are therefore relatively complex.

For such systems, conventional mechanisms such as asynchronous message queues, data buses and event mechanisms are normally used to enable inter-process communication. With message, bus or event based mechanisms, it is difficult for a system user to determine the state and/or configuration of the system.

It would be desirable therefore to provide means by which a dynamic multi-process system could readily be managed.

SUMMARY OF THE INVENTION

Accordingly, a first aspect of the invention provides a system comprising a network of network elements, each network element supporting one or more processes, the network further comprising a data store associated with a data store manager, wherein the data store contains data representing the actual state of the system and data representing a planned state of the system, the data store manager being arranged to cause at least some of said network elements or processes to conform with said planned system state, and at least some of said processes being arranged to communicate to said data store manager data representing their respective state, the data store manager, upon receipt of said data from said at least some processes, being arranged to update said actual state data in accordance with said received data.

Providing an actual state model and a planned state model in accordance with the invention allows the system to be readily managed.

In a preferred embodiment, at least some of said processes are arranged to register with the data store manager an indication of one or more changes in the actual state of the system in respect of which they are to be notified, the data store manager, upon detection of one or more of said changes in the actual system state, being arranged to notify the or each process that has registered in respect of the or each detected state change.

Preferably, the data store includes data representing one or more permitted states of the system. More preferably, the data store manager, upon receiving data representing a change in the actual state of the system, determines from said permitted state data if said change in state is permitted and, upon determining that said change in state is permitted, updates said actual state data in respect of said change in state.

In a preferred embodiment, at least some of said network elements include a respective process manager arranged to receive data from said store manager representing the planned state of the respective network element and, upon receiving said planned state data, to cause said network element to adopt said planned state.

Preferably, at least some of said network elements include a respective process manager arranged to detect the instantiation of processes on the respective network element and to report detected instantiations to said data store manager.

In preferred embodiments, the data store manager is arranged to perform a persistent search of the data store based on respective search criteria provided by one or more of said processes.

A second aspect of the invention provides a method of managing a system comprising a network of network elements, each network element supporting one or more processes, the network further comprising a data store associated with a data store manager, wherein the data store contains data representing the actual state of the system and data representing a planned state of the system, the method comprising causing at least some of said network elements or processes to conform with said planned system state, and updating said actual state data in accordance with data provided by at least some of said processes representing their respective state.

A third aspect of the invention provides a computer program product comprising computer usable instructions for causing a computer to perform the method of the second aspect of the invention.

A fourth aspect of the invention provides a data store manager for use in a system comprising a network of network elements, each network element supporting one or more processes, the data store manager being associated with a data store, wherein the data store contains data representing the actual state of the system and data representing a planned state of the system, the data store manager being arranged to cause at least some of said network elements or processes to conform with said planned system state, and at least some of said processes being arranged to communicate to said data store manager data representing their respective state, the data store manager, upon receipt of said data from said at least some processes, being arranged to update said actual state data in accordance with said received data.

Other preferred features of the invention are recited in the dependent claims.

Further advantageous aspects and features of the invention will become apparent to those ordinarily skilled in the art upon review of the following description of a specific embodiment of the invention and with reference to the accompanying drawings.

The preferred features as described herein or as described by the dependent claims filed herewith may be combined as appropriate, and may be combined with any of the aspects of the invention as described herein above or by the independent claims filed herewith, as would be apparent to those skilled in the art.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
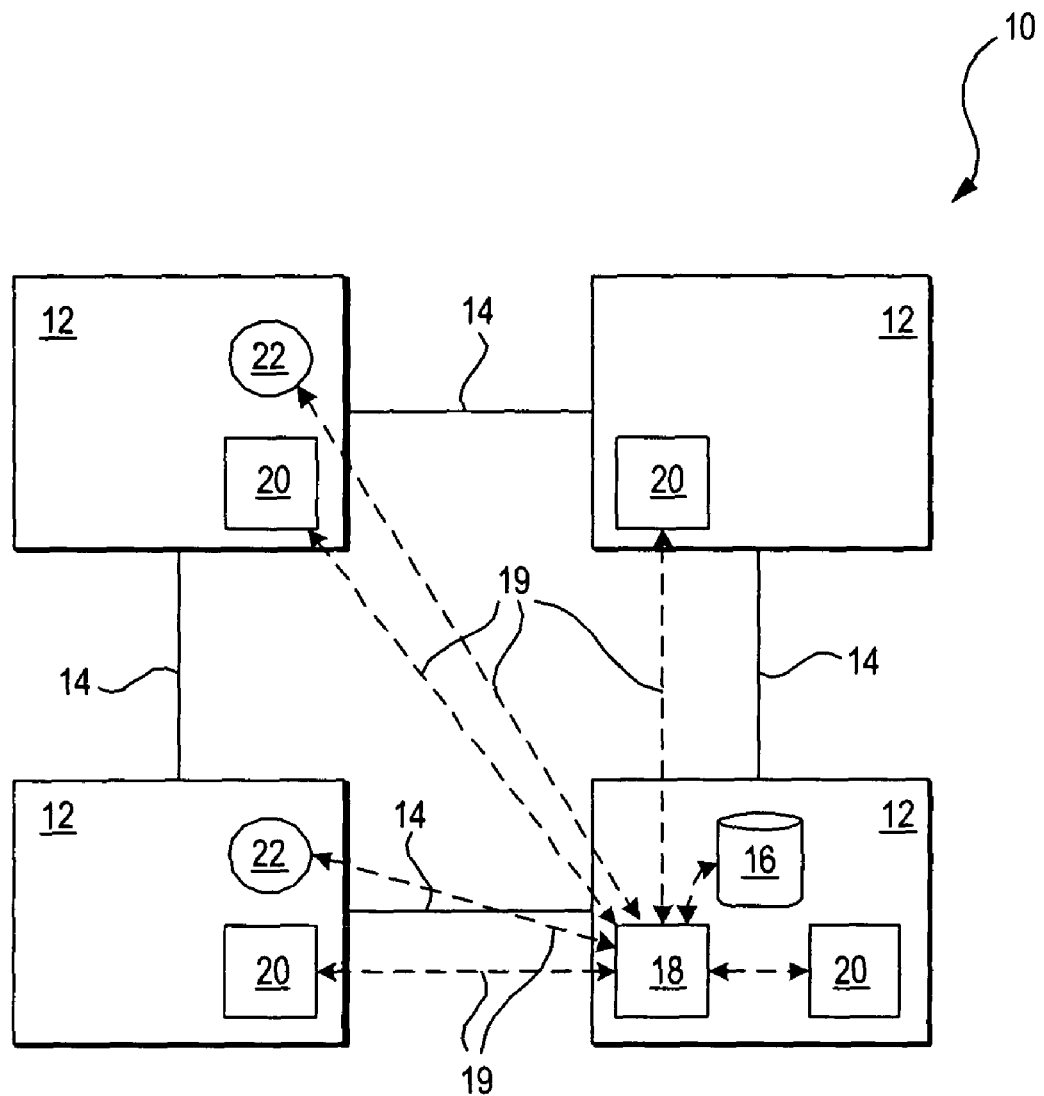
FIG. 1 presents a block diagram of a multi-process system embodying a first aspect of the invention.

Referring now to FIG. 1 of the drawings, there is shown, generally indicated as 10, a system comprising a network of network elements 12. Each network element 12 may comprise a computer, platform or other data processor capable of supporting one or more computer programs or processes (not shown in FIG. 1). To this end, each network element 12 typically includes an operating system (not shown). By way of example, each network element 12 may comprise any one of a workstation, a personal computer (PC), a printer (or other peripheral device), a multiplexer, a router, or other hardware device.

Each network element 12 is connected to at least one other network element 12 by means of a physical layer connection 14 such as, for example, a LAN (local Area Network) connection, WAN (Wide Area Network) connection or optical fibre connection. In FIG. 1, the system 10 is shown with four network elements 12 by way of example only. The system 10 may comprise any number of network elements 12 interconnected in any manner. The system 10 may be described as a distributed system in that it comprises a plurality of physically separate network elements 12.

The system 10 comprises a memory or data store 16 for holding data describing one or more models (not shown in FIG. 1) of the system 10. The data may, for example, be stored in the form of a directory or database. The store 16 may, for example, take the form of a cache memory, although any other storage means may alternatively be used. In the preferred embodiment, the store 16 comprises a permanent, or non-volatile, store for the system model. The data contained in the store 16 is therefore preserved should the system 10 be turned off or interrupted. The store 16 may conveniently comprise a third party database or directory.

The store 16 is associated with a store manager 18, typically in the form of a computer program or process, which may retrieve data concerning the system model from the store 16 and may update, adjust or otherwise maintain, the data describing the system.

In the preferred embodiment, each network element 12 includes, or is associated with, a process manager 20 capable of communicating with the store manager 18 in order that data concerning the system model may be passed between the store manager 18 and the process managers 20. Communication between the process managers 20 and the store manager 18 typically take place via a respective application layer communication link 19 using, for example TCP/IP protocols. Each network element 12 preferably includes a respective process manager 20, conveniently in the form of a computer program or process that is run upon start up of the operating system supported by the respective network element 12. The process managers 20 may be described as proxy agents or proxy processes in that they serve as intermediaries (as is described in further detail hereinafter) between processes (not shown in FIG. 1) running on the respective network element 12 and the store manager 18. More particularly, in the preferred embodiment, the process managers 20 serve as proxies between the operating system of the respective network element 12 and the store manager 18. The process managers 20 enable the state of the respective network element 12 to be reported and queried.

In FIG. 1, the store 16 and store manager 18 are shown, by way of example, to reside at one of the network elements 12. In alternative embodiments, the store 16 and store manager 18 need not necessarily reside at the same network element 12, may reside at a dedicated management network element (not shown) and/or the store 16 may be distributed amongst more than one network element 12.

Figure 2:
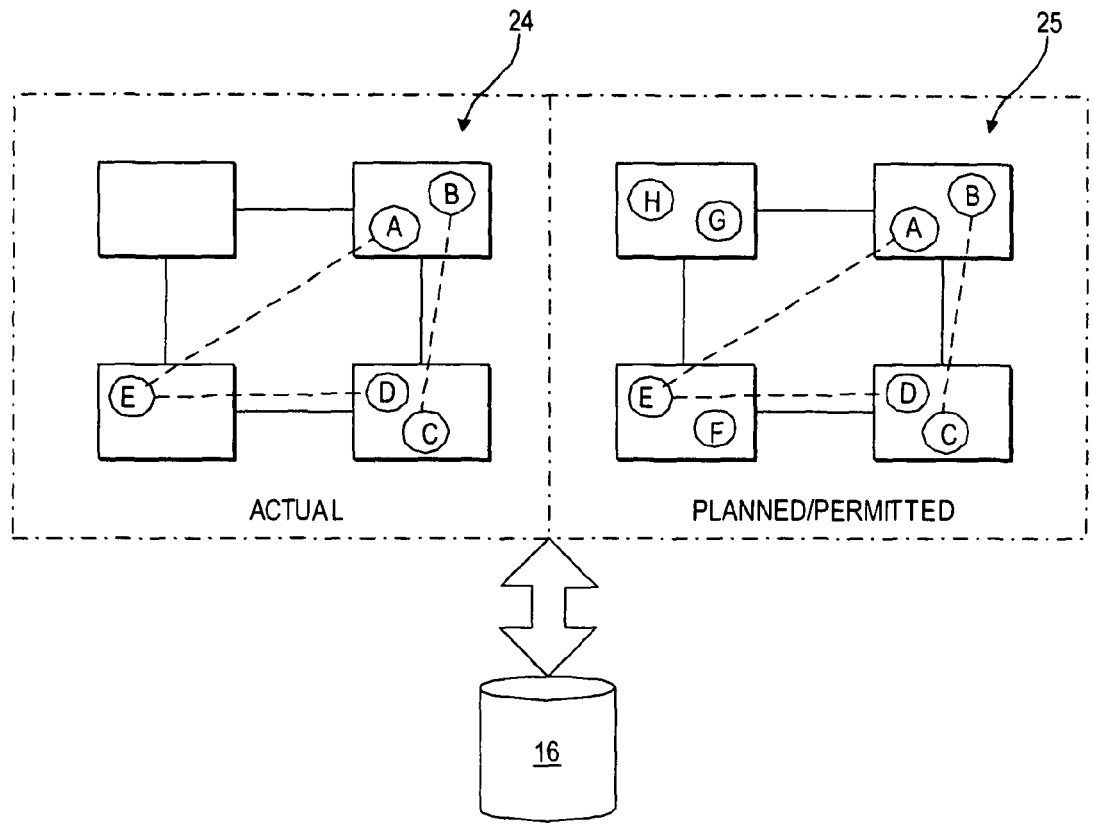
FIG. 2 presents a block diagram of a memory storing a model of the system of FIG. 1.
Figure 3:
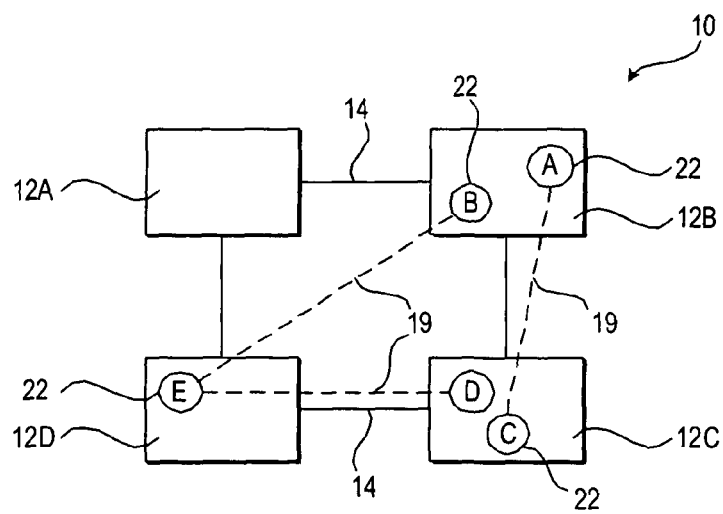
FIG. 3 presents a block diagram of the actual system configuration at a particular instant.

In FIGS. 2 to 4, the store manager 18 and process managers 20 are not shown for reasons of clarity.

Referring now to FIG. 3, each network element 12 supports one or more computer program components, or processes 22. Some of the processes 22 may be initiated, or instantiated, upon start up, or activation, of the respective network element 12, others may subsequently be initiated during use of the system 10. Some of the processes 22 may be terminated during use of the system 10. The status and configuration of the processes 22 may vary during use depending on, for example, system events, user interaction and/or addition of or removal of network elements or processes. More generally, the state of the system 10 is dynamic during use, where the state of the system may comprise any aspects of status or configuration of any of the system components, including network elements 12, processes 22 and communication links 14, 19 between components. Changes to the system 10 may occur at a physical level when network elements 12 and physical layer connections 14 are added or removed, and/or at a higher level, e.g. applications layer level, as processes 22 are substantiated, terminated or change their configuration.

By way of example, FIG. 3 shows some aspects of the actual state of the system 10 at a notional instant during use. Network elements 12B and 12C are each assumed to be running a respective two processes A, B and C, D, while network element 12D is assumed to be running one process E. No processes are running on network element 12A. A respective applications layer communications link 19 is established between process E and processes B and D. A respective applications layer communications link 19 is established between process A and process E.

FIG. 2 illustrates how the store 16 maintains a first model 24, or data set, of the actual state of the system 10. The model 24 (which is shown pictorially in FIG. 2 for the sake of clarity) comprises data describing the system 10, including the state of the system 10. In the preferred embodiment, the model 24 includes data identifying each component (including network elements 12 and processes 22) of the system 10, and the status and configuration of each component. Status data may include whether or not the component is idle or active, or instantiated or terminated. Other state or configuration data may, by way of example, include: details of communications links 14, 19 with other components; operational modes; user identification; communications data such as which port numbers to use for communication, how many client/peer connections to permit, location of logging service; security data such as access control data; system data such as file locations and disk drive mount points; and preference data such as basic configuration details, such as which colour to display the GUI, which menus to enable, and so on.

The store 16 thus includes data describing the actual configuration, or state, of the system 10 (as exemplified by the system 10 of FIG. 3). In addition, however, the store 16 advantageously stores data describing components, and especially processes 22, that are planned and/or permitted in the system 10 even if they are not currently active. In the preferred embodiment, the store 16 comprises a second system model 25, or data set, comprising data describing the planned and/or permitted system 10. Advantageously, the second system model 25 comprises data describing the planned or permitted state or configuration of the system components, especially the processes 22. For example, in FIG. 2, the model 25 includes data describing two processes G, H that are supported by network element 12A but which are not currently instantiated. Similarly, the model 25 includes data identifying a non-instantiated process F residing at network element 12D. The model 25 may also include data describing the planned or permitted configuration of one or more of the system components 12, 22. The data representing each system component in model 25, and especially the processes 22, is associated with a respective indicator, or flag, indicating whether the component is a planned component or a permitted component. If a process 22 is a planned process, then the store manager 18 causes the process 22 to be instantiated. If a process 22 is a permitted process, then the store manager 18 does not necessarily cause the process 22 to be instantiated. Rather, the permitted process 22 may become instantiated during operation of the system 10 in response to one or more system events. Configuration data pertaining to the system components 12, 22 may also be designated as planned or permitted.

In an alternative embodiment, the store 16 may maintain a single set of data describing the actual and planned/permitted states of the system 10.

An example of the operation of the system 10 is now described. Upon start up of the system 10, the store manager 18 retrieves data describing the desired initial state of the system 10 from the store 16. In particular, the retrieved data comprises data relating to, or describing, the planned system components as contained in the planned/permitted system model 25. The retrieved data typically includes configuration data, in respect of each network element 12, identifying which process(es) 22 are to be instantiated and may also include data describing the desired state or configuration of the process(es) 22 to be instantiated. The store manager 18 communicates the respective retrieved data to the respective process manager 20 of each network element 12. The respective process manager 20 causes the appropriate process(es) 22 to be instantiated in accordance with the respective data. Hence, at start-up, the system 10 adopts an initial state as described by the planned components of system model 25.

During use of the system 10, one or more processes 22 may be instantiated, terminated or may undergo a change in state or configuration. Similarly, one or more network elements 12 may be added to or removed from the system 10, or one or more existing network elements 12, or communications links 14, 19 may undergo a change in state or configuration. Any such events are reported to the store manager 18 so that the data contained within the store 16, and more particularly the actual system model 24, may be updated. As a result, the store 16, and more particularly the actual system model 24, contains data that describes the current, or actual, state of the system 10.

When the store manager 18 is notified of a non-planned process 22, it refers to the planned/permitted model 25 to determine if the process 22 is permitted. If the model 25 does not contain data identifying or describing the process 22, then the store manager 18 concludes that the process 22 is not permitted and may cause the process 22 to be terminated. In this way, the system 10 is able to control rogue or unwanted processes.

During use, processes 22 may query the store 16, via the store manager 18, in order to obtain data describing the current (insofar as the store 16 has been updated) state of the system 10 (from the actual model 24).

Advantageously, each process 22 may register with the store manager 18 an interest in one or more system events which affect the state of the system 10 (and which are therefore reported to the store manager 18).

When the store manager 18 is notified of the occurrence of a system event, it informs each process 22 that has registered an interest in the event that the event has taken place. Typically, the store manager 18 updates the store 16 (and more particularly the actual model 24) when notified of a change in the state of the system 10 and then checks if any processes 22 have registered an interest in the state change. The store manager 18 may also communicate to the, or each, interested process 22 data describing the event/state change. In this way, the processes 22 and the store manager 18 may together be said to perform a persistent search for relevant system events, or state changes. In the preferred embodiment, the processes 22, store manager 18 and store 16 together provide a permanent store and persistent search mechanism.

For example, updates to system configuration, or state, such as bringing a new network element under the management of the system 10, results in a corresponding modification to the configuration data held in the store 16. Processes 22 that are interested in new network elements 12 may register with the store manager 18 to be notified whenever network element configuration data is modified in the store 16 and so will be notified whenever a new network element 12 is added to the system 10.

In the preferred embodiment, communication between the processes 22 and the store manager 18 may be performed directly via a respective applications layer link 19.

Alternatively, or in addition, the respective process manager 20 may communicate data to the store manager 18 relating to processes 22 on the respective network element 12. For example, the process managers 20 may detect and report the appearance of a non-planned process.

In an alternative embodiment, the processes 22 may poll or query the store 16 at intervals in order to detect relevant changes in the state of the system.

By way of simple example, a process 22 may comprise a Graphical User Interface (GUI) (not illustrated) for presenting a user with a list of all network elements 12 present in the system 10. When the GUI is instantiated, its instantiation is reported to the store manager 18 (either by the GUI itself or by the respective process manager 20) and it registers an interest in receiving data describing the network elements 12 of the system 10. Hence, once the store manager 18 is notified of the instantiation of the GUI, it communicates to the GUI a list of network elements 12 retrieved from the store 16. The user (not shown) may wish to instantiate a process, or application, that is made available to him by the GUI. Assuming the process is permitted, it is instantiated and the instantiation is reported (either by the process itself or by the respective process manager 20) to the store manager 18 which updates the actual system model 24. Configuration data, for example the identity of the user, may also be reported to the store manager 18.

Should the user attempt to instantiate a process that is not permitted, then the store manger 18 may cause the respective process manager 20 to terminate the non-permitted process.

In the preferred embodiment, the store 16, and in particular the actual system model 24, is backed-up, at intervals so that a record of the system's state, especially the actual system state, over time is maintained. This may conveniently be performed by the store manager 18. As a result, should there be a full or partial system failure, the state of the system 10 prior to the failure is recorded and may readily be restored after recovery. Moreover, recording the state of the system 10 at intervals allows a record of the system's 10 use and configuration over time to be maintained.

It will be apparent from the foregoing description that the planned system state, as defined by the planned/permitted system model 25, is imposed upon the system 10 by a combination of the action of the store manager 18 and the system components 12, 22 in referring to the store 16. As the planned system state is implemented, the system components report their state to the store manager 18 which updates the actual system model 24. As a result, the actual system model 24 becomes identical, or similar to, the planned system model 25 (some aspects of the planned system may not be implementable because of, for example, an unexpected system failure).

The store 16 may comprise more than one planned/permitted system model 25. The store manager 18 may select which planned/permitted system model 25 to impose upon the system 10 depending on, for example, the time of day or any other condition. Moreover, the or each planned system model 25 may be modified at run time, i.e. during use of the system 10, in order to effect changes in the system 10.

In the preferred embodiment, the system 10 implements a permanent store and persistent search mechanism as the main communication enabler within the system 10. The permanent store 16 contains at least one model 24, 25 of the system state or configuration and each of the processes 22 of the system 10 may obtain, e.g. by query, data from the store 16 in order to determine the current system configuration (or desired system configuration at start-up, or may modify the system configuration recorded in the store 16 by performing an update operation to the permanent store 16, or may receive notification of a change to the system model via the persistent search mechanism. A persistent search involves the store manager 18 applying search criteria to the data contained in the store 16 each time the data is modified or updated. In a persistent search mechanism, one or more clients, e.g. the processes 22, provide respective search criteria to the store manager 18 and, upon modification to the contents of the store 16, the store manager 18 performs a search of the store 16 on accordance with the provided search criteria, the results of the search being reported to the respective client. In the present case, the respective search criteria are determined by the respective events in respect of which each process 22 registers an interest. An example of how a persistent search may be implemented is by use of the LDAP persistent search mechanism defined in "Persistent Search: A Simple LDAP Change Notification Mechanism". The combination of permanent store and persistent search mechanism enables processes 22 to acquire configuration data at start-up, receive real-time updates, and re-synchronise periodically if necessary.

The store 16 reduces the potential for processes 22 to become unsynchronised since the store contains unified source, or single master, of data describing the system 10 and the persistency is consistent (i.e. reduces the potential for more than one process 22 to have a respective different version of the system configuration data). This is in contrast with conventional messaging/bus/event based systems (not shown) in which it is difficult for a user to determine the state or configuration of the system since there is no single system component or store containing the required state/configuration data. Provision of a permanent store permits replication, and referral mechanisms to be leveraged and so there is potential for deploying multiple replicated stores 16 permitting resiliency, redundancy, or load balancing.

It will be apparent from the foregoing that the store 16 provides a unified model of a distributed system. This enables a system user, for example an administrator, to view the actual state and configuration of the system 10 readily without the need to access multiple network elements 12. Moreover, the state of the system 10 may readily be altered (by making changes to the planned system model 25, or introducing a new planned system model 25) without having to access multiple network elements 12. In particular, because at least some of the processes 22 make reference to the store 16 to obtain relevant configuration data, there is no need for a user to access the respective network element 12 in order to configure or re-configure its processes 22. In addition, maintenance outages can be planned and initiated centrally via the store 16. Providing a centralised data store 16 also reduces the disk space requirements at the respective network elements 12 and obviates the need to store sensitive information on individual network elements 12.

The system 10 may also readily implement a security, or right of access, policy. For example, depending on one or more aspects of the configuration of a process 22 (e.g. user identification or process role), the store manager 18 may allow the process 22 access to only part of the planned system model 25.

It will be apparent that the system models 24, 25 need not necessarily include data describing each and every aspect of the state or configuration the system 10 and may, for example, only comprise data that is relevant to the management of the system 10. The level of detail of the models 24, 25 may therefore vary from system to system, or even depending on the mode of use of a given system.

In some systems, the network elements may not be able to communicate directly with the store manager (for example, the network elements may not support application layer communications). In such cases, communications between the network elements 12 and the store manager 18 may be performed via a network element manager (not shown). The network element manager may take the form of a proxy agent adapted to enable communication between the network element and store manager. The respective process manager of the network element may be adapted to serve as a proxy agent between the network element and store manager.

The invention is not limited to the embodiment describe herein which may be modified or varied without departing from the scope of the invention.

The invention claimed is:

1. A system comprising a network of network elements, each network element supporting at least one respective process, the network further comprising a data store associated with a data store manager, wherein the data store maintains a first model of said system, said first model representing an actual state of the system and including data identifying each of said network elements and each of said at least one respective processes that is instantiated on respective network elements, said first model further including data representing the actual state of said at least one respective process, and wherein the data store maintains a second model of said system, said second model being independent of said first model and representing a planned state of the system, said second model including data identifying each of said network elements and, in respect of each network element, at least one of said at least one respective processes that is planned to be instantiated on the respective network element, the data store manager being arranged to cause the respective network elements to instantiate each respective process that said second model identifies as being planned to be instantiated on the respective network element but is not yet instantiated on the respective network element, and at least some of said processes being arranged to communicate to said data store manager data representing their respective state, the data store manager, upon receipt of said data from said at least some processes, being arranged to update said first model in accordance with said received data, wherein the data store manager is arranged to perform a persistent search of the data store based on respective search criteria provided by one or more of said processes.

2. A system as claim in claim 1, wherein said data store contains a first data set data comprising data representing said first model of said system and a second data set representing said second model of said system.

3. A system as claimed in claim 1, wherein the data store manager is arranged to select said second model from a plurality of different second models.

4. A system as claimed in claim 1, wherein at least some of said processes are arranged to register with the data store manager an indication of one or more changes in said actual state in respect of which they are to be notified, the data store manager, upon detection of one or more of said changes in said actual state, being arranged to notify the or each process that has registered in respect of the or each detected state change.

5. A system as claimed in claim 4, wherein the data store manager monitors said first model of the system to detect changes in said actual state.

6. A system as claimed in claim 1, wherein the data store includes data representing one or more permitted states of said at least one respective process.

7. A system as claimed in claim 6, wherein the data store manager, upon receiving data representing a change in said actual state, determines from said permitted state data if said change in state is permitted and, upon determining that said change in state is permitted, updates said first model in respect of said change in state.

8. A system as claimed in claim 6, wherein the data store includes data representing one or more respective processes that are permitted to run on each network element.

9. A system as claimed in claim 8, wherein the data store manager, upon receiving data indicating that a new process has been instantiated, determines from said permitted process data if said new process is permitted and, upon determining that said new process is permitted, updates said first model in respect of said new process.

10. A system as claimed in claim 9, wherein the data store manager, upon determining that said new process is not permitted, causes said new process to be terminated.

11. A system as claimed in claim 1, wherein at least some of said network elements include a respective process manager arranged to receive data from said store manager representing the planned state of the respective network element and, upon receiving said planned state data, to cause said network element to adopt said planned state.

12. A system as claimed in claim 11, wherein said respective process manager is arranged to receive data from said store manager representing one or more planned processes and, upon receiving said planned state data, to cause the or each planned process to be instantiated on the respective network element.

13. A system as claimed in claim 1, wherein at least some of said network elements include a respective process manager arranged to detect the instantiation of processes on the respective network element and to report detected instantiations to said data store manager.

14. A method of managing a system comprising a network of network elements, each network element supporting at least one respective process, the network further comprising a data store associated with a data store manager, wherein the method comprises: maintaining, in said data store, a first model of said system, said first model representing an actual state of the system and including data identifying each of said network elements and each of said at least one respective processes that is instantiated on respective network elements, said first model further including data representing the actual state of said at least one respective process; and maintaining, in the data store, a second model of said system, said second model being independent of said first model and representing a planned state of the system, said second model including data identifying each of said network elements and, in respect of each network element, at least one of said at least one respective processes that is planned to be instantiated on the respective network element, the method further comprising causing said the respective network elements to instantiate each respective process that said second model identifies as being planned to be instantiated on the respective network element but is not yet instantiated on the respective network element, and updating said first model in accordance with data provided by at least some of said processes representing their respective state, wherein the data store manager is arranged to perform a persistent search of the data store based on respective search criteria provided by one or more of said processes.

15. A method as claimed in claim 14, comprising selecting said second model from a plurality of different second models.

16. A method as claimed in claim 14, comprising registering with the data store manager, in respect of at least some of said processes, an indication of one or more changes in said actual state in respect of which the respective processes are to be notified, and, upon detection of one or more of said changes in said actual state, notifying the or each respective process.

17. A method as claimed in claim 16, comprising monitoring said first model to detect changes in said actual state.

18. A method as claimed in claim 14, wherein the data store includes data representing one or more permitted states of said at least one respective process, the method comprising, upon receiving data representing a change in said actual state, determining from said permitted state data if said change in state is permitted and, upon determining that said change in state is permitted, updating said first model in respect of said change in state.

19. A method as claimed in claim 18, wherein the data store includes data representing one or more respective processes that are permitted to run on each network element, the method comprising, upon receiving data indicating that a new process has been instantiated, determining from said permitted process data if said new process is permitted and, upon determining that said new process is permitted, updating said first model in respect of said new process.

20. A method as claimed in claim 19, comprising causing said new process to be terminated upon determining that said new process is not permitted.

21. A method as claimed in claim 14, wherein at least some of said network elements include a respective process manager, the method including receiving, at a respective process manager, data from said store manager representing the planned state of the respective network element and, upon receiving said planned state data, causing said network element to adopt said planned state.

22. A method as claimed in claim 21, comprising receiving, at a respective process manager, data from said store manager representing one or more planned processes and, upon receiving said planned state data, causing the or each planned process to be instantiated on the respective network element.

23. A method as claimed in claim 14, comprising detecting the instantiation of processes on a respective network element and reporting detected instantiations to said data store manager.

24. A computer program product implemented in a non-transitory computer readable medium comprising computer usable instructions for causing a computer to perform the method of claim 14.

25. A data store manager for use in a system comprising a network of network elements, the data store manager including computer usable instructions implemented in a non-transitory computer readable medium, each network element supporting at least one respective process, the data store manager being associated with a data store, wherein the data store maintains a first model of said system, said first model representing an actual state of the system and including data identifying each of said network elements and each of said at least one respective processes that is instantiated on respective network elements, said first model further including data representing the actual state of said at least one respective process, and wherein the data store maintains a second model of said system, said second model being independent of said first model and representing a planned state of the system, said second model including data identifying each of said network elements and, in respect of each network element, at least one of said at least one respective processes that is planned to be instantiated on the respective network element, the data store manager being arranged to cause said the respective network elements to instantiate each respective process that said second model identifies as being planned to be instantiated on the respective network element but is not yet instantiated on the respective network element, and at least some of said processes being arranged to communicate to said data store manager data representing their respective state, the data store manager, upon receipt of said data from said at least some processes, being arranged to update said first model in accordance with said received data, wherein the data store manager is arranged to perform a persistent search of the data store based on respective search criteria provided by one or more of said processes.

26. A data store manager as claim in claim 25, wherein the data store manager is arranged to select said second model from a plurality of different second models.

27. A data store manager as claimed in claim 25, wherein at least some of said processes are arranged to register with the data store manager an indication of one or more changes in said actual state in respect of which they are to be notified, the data store manager, upon detection of one or more of said changes in the actual state, being arranged to notify the or each process that has registered in respect of the or each detected state change.

28. A data store manager as claimed in claim 27, wherein the data store manager monitors said first model to detect changes in the actual state.

29. A data store manager as claimed in claim 25, wherein the data store includes data representing one or more permitted states of said at least one respective process, and wherein the data store manager, upon receiving data representing a change in said actual state, determines from said permitted state data if said change in state is permitted and, upon determining that said change in state is permitted, updates said first model in respect of said change in state.

30. A data store manager as claimed in claim 29, wherein the data store includes data representing one or more respective processes that are permitted to run on each network element, and wherein the data store manager, upon receiving data indicating that a new process has been instantiated, determines from said permitted process data if said new process is permitted and, upon determining that said new process is permitted, updates said first model in respect of said new process.

31. A data store manager as claimed in claim 30, wherein the data store manager, upon determining that said new process is not permitted, causes said new process to be terminated.

32. A system comprising a network of network elements, each network element supporting at least one respective process, the network further comprising a data store associated with a data store manager, wherein the data store maintains a first model of said system, said first model representing, an actual state of the system and including data identifying each of said network elements and each of said at least one respective processes that is instantiated on respective network elements, said first model further including data representing the actual state of said at least one respective process, and wherein the data store maintains a second model of said system, said second model being independent of said first model and representing a planned state of the system, said second model including planned process data identifying each of said network elements and, in respect of each network element, at least one of said at least one respective processes that is planned to be instantiated on the respective network element, the data store manager being arranged to cause the respective network elements to instantiate each respective process that said second model identifies as being planned to be instantiated on the respective network element but is not yet instantiated on the respective network element, and at least some of said processes being arranged to communicate to said data store manager data representing their respective state, the data store manager, upon receipt of said data from said at least some processes, being arranged to update said first model in accordance with said received data, and wherein in addition to said planned process data, said second model includes, in respect of at least some of said network elements, permitted process data identifying one or more respective processes, other than said planned processes, that are permitted to run on the respective network element, and wherein, the data store manager, upon receiving data indicating that a non-planned process has been instantiated on any one of said network elements, is configured to determine from the respective permitted process data of said second model if said non-planned process is permitted and, upon determining that said non-planned process is permitted, to update said first model in respect of said non-planned process and, upon determining that said non-planned process is not permitted, to cause said new process to be terminated, wherein the data store manager is arranged to perform a persistent search of the data store based on respective search criteria provided by one or more of said processes.

\* \* \* \* \*